Nov. 15, 1927.
R. C. BENNER ET AL
1,649,280
NEGATIVE ELECTRODE FOR STORAGE BATTERIES
Filed Sept. 10, 1923
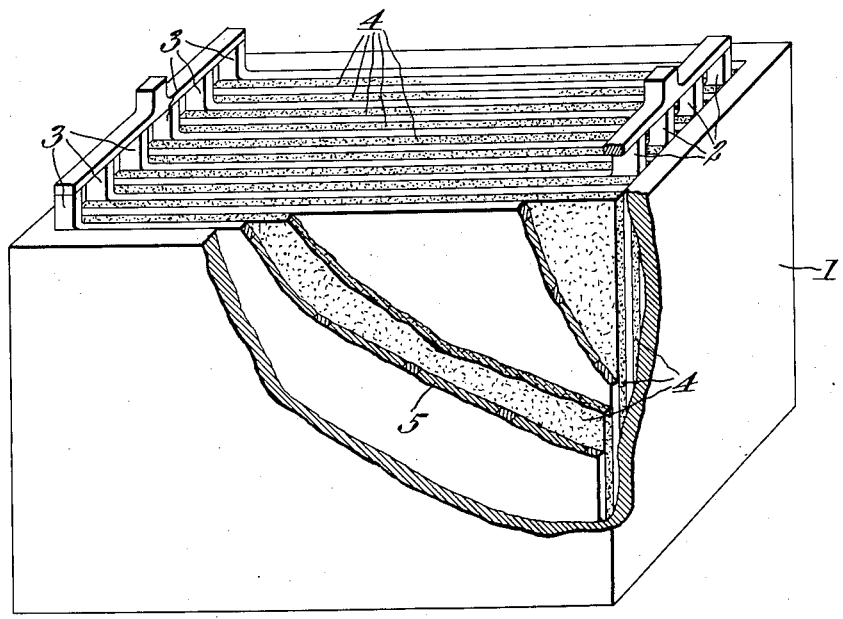
Inventors:
Raymond C. Benner,
Leroy C. Werking,
By Byrnes, Townsend & Brickenstein,
Attorneys.

Patented Nov. 15, 1927.

1,649,280

UNITED STATES PATENT OFFICE.

RAYMOND C. BENNER, OF BAYSIDE, AND LEROY C. WERKING, OF NEW YORK, N. Y., ASSIGNORS, BY MESNE ASSIGNMENTS, TO PREST-O-LITE STORAGE BATTERY CORPORATION, A CORPORATION OF INDIANA.

NEGATIVE ELECTRODE FOR STORAGE BATTERIES.

Application filed September 10, 1923. Serial No. 661,934.

This invention relates to improvements in negative electrodes for storage batteries of the lead-sulfuric acid type. A particular object of the invention is to prevent the consolidation of the negative active material.

In the operation of storage batteries, the finely divided lead of the negative electrode tends to coalesce or cohere after a certain number of cycles of charge and discharge, the number varying with particular conditions. As this action takes place the porosity of the lead is correspondingly decreased. The electrical capacity of the electrode is largely dependent upon porosity, and it is therefore necessary to prevent consolidation of the active material so far as possible.

This result is generally sought by the addition of "expanders" to the negative active material. Expanders may be soluble or insoluble substances having the property of diminishing the tendency of the lead particles to unite. As illustrative of commercial practice in this respect, it may be said that barium sulfate, sodium sulfate, and lamp black are used, individually or in admixture.

Heretofore it has not been practical to add expanders in amounts sufficient to secure the optimum porosity and freedom from consolidation. The expanders generally cause the active material to swell to a considerable extent during the operation of the battery, and the result is a pronounced tendency on the part of the material to crumble or scale off the electrode. The use of expanders, prior to the present invention, has been considered to be strictly limited by the fact that they promote the displacement of the active material from the grid.

We have discovered that the most desirable proportion of expander, so far as insuring porosity and preventing consolidation is concerned, is in material excess of that heretofore considered to be the maximum which could be practically used. We have further discovered that this maximum can be safely exceeded when "armored" plate constructions are provided. With this construction, proportions of expander up to that giving substantially the maximum freedom from consolidation during normal service may be mixed with the active material.

In application Serial No. 650,165, filed on July 7, 1923, by R. C. Benner, the use of relatively large proportions of expander is indicated, and a prefered form of the armored construction is described. In this construction, acid-resistant separators, pervious to electrolyte but substantially impermeable by crystal growths or dislodged particles of active material, are placed in direct contact with the lateral surfaces of the positive and negative plates. The separators may be of various kinds. Preferred forms are described in detail in the application of R. C. Benner, Ser. No. 628,843 filed March 20, 1923, and the following U. S. patents of R. C. Benner: No. 1,500,220, dated July 8, 1924, and No. 1,573,369, dated February 16, 1926.

As described in these applications, soluble and insoluble fibers may be mixed with a binder, such as rubber, and formed into sheets. When very porous sheets are used, their pores may be obstructed with gelatinous silica, which prevents passage of active material but is sufficiently permeable to permit substantially uninterrupted electrolytic action. Or cellulosic fibers may be bonded with gelatinous silica, which forms a siliceous film on the surface of the separator, preventing disintegration by the acid or by contact with postive active material.

Suitable separators may be made in other ways, for example by bonding glass wool with sodium silicate or asbestos fiber with rubber.

The armoring separators prevent displacement of the active material and the desired amount of expander may be used without regard to its tendency to cause loosening and sloughing. We may, for example, use from 2 to 10% of barium sulfate or from 0.35 to 5% lampblack, or even higher percentages. Lampblack and barium sulfate may be used together in the negative active material composition. The following formula is illustrative:

| | Per cent. |
|---|---|
| Litharge | 92.0 |
| Barium sulfate | 5.0 |
| Lampblack | 3.0 |

The amounts of expander refered to are in material excess of those now considered to be safe, as will appear from comparison with the following typical negative mixes used according to prior practice:

|  | I. | II. |
|---|---|---|
| Litharge | 98.8 | 99.38 |
| Barium sulfate | 1.0 | .50 |
| Lampblack | .2 | .12 |

The expanders may be added to litharge or other reducible lead compound, or to finely divided lead. Preformed negative electrodes, comprising finely divided lead and a relatively large proportion of a material adapted to insure porosity, are described and claimed in application Serial No. 650,729, filed July 10, 1923, by R. C. Benner et al.

By using increased amounts of expander, as above specified, material advantages are obtained. Not only is the capacity of the battery increased by the continued porosity of the negative electrodes throughout the service life, but their porosity also substantially avoids the disruptive buckling of the electrodes during charge, or under other conditions, as more fully discussed in Serial No. 650,165, mentioned above.

The amount of expander added should not be sufficient to impair substantially the electrical contact between the particles of lead. The optimum porosity and freedom from consolidation may be obtained by proportions of expander which do not have this objectionable result. These proportions will vary widely with the nature of the active material, the service requirements, and other conditions. The presence of considerable amounts of inert matter is without consequence, in view of the high porosity of the composition. The electrolyte may reach substantially all the active material and the capacity is therefore equivalent to that of dense plates containing much more lead.

One type of battery in which the present invention may be successfully used is illustrated somewhat diagrammatically in the single perspective figure of the accompanying drawing.

Reference numeral 1 denotes a battery box or casing of any suitable kind, containing positive electrodes 2 and negative electrodes 3, the latter comprising a relatively high percentage of expander. The grids of the electrodes are preferably made resistant to peroxidation, as described in Serial No. 650,165. Armoring separators 4, pervious to electrolyte but substantially impervious to active material, and resistant to acid and oxidation, abut against the faces of the electrodes. Expansion of the negative active material 5 is harmless, since the separators prevent its displacement from the electrodes.

There are five chief factors limiting the life of storage cells, that is, disintegration of the separators, buckling of the plates, shedding of the positive active material, peroxidation of the positive grid, and consolidation of the negative electrode. In the construction described the effect of these limitations is obviated to a marked extent.

The present invention is not restricted to the use of any particular material for preventing consolidation. Such material may or may not have the property of actually expanding the active material, but in either case it is referred to herein as an "expander", in accordance with usage of this term in the art. As to the amount of expander in the negative active material, the invention includes all suitable proportions of expander in excess of that which could be practically used without armoring means. While armoring separators of the type described are preferred, excess expander is applicable with advantage in any battery construction in which the coherence of the active material is not alone depended upon to prevent its displacement. The term "armored" is used herein to describe all such constructions.

We claim:

1. In combination, a storage battery negative electrode comprising a mixture of active material, from 2 to 10% barium sulfate and from 0.35 to 5% lampblack, and a non-deteriorating separator pervious to electrolyte but impervious to the active material, and held in direct contact with the active material of the negative electrode to counteract the disintegrating action of the barium sulfate and lampblack expander.

2. An active material composition for armored negative electrodes comprising finely divided lead, from 2 to 10% of barium sulfate and from 0.35 to 5% lampblack.

3. An active material composition for armored negative electrodes, and comprising about 5.0% barium sulfate and 3.0% lampblack.

In testimony whereof, I affix my signature.
RAYMOND C. BENNER.

In testimony whereof, I affix my signature.
LEROY C. WERKING.